United States Patent [19]

Fujihara et al.

[11] Patent Number: 4,852,985
[45] Date of Patent: Aug. 1, 1989

[54] ILLUMINATING DEVICE FOR MICROSCOPES

[75] Inventors: Tadafumi Fujihara; Yoshihiro Shimada; Chikara Nagano, all of Tokyo; Katsuo Tsukamoto, Sendai, all of Japan

[73] Assignee: Olympus Optical Co., Ltd., Tokyo, Japan

[21] Appl. No.: 108,935

[22] Filed: Oct. 16, 1987

[30] Foreign Application Priority Data

Oct. 16, 1986 [JP] Japan ................. 61-246187

[51] Int. Cl.$^4$ ............................. G02B 21/06
[52] U.S. Cl. ....................... 350/523; 350/525; 350/527
[58] Field of Search ............... 350/523, 525, 526, 527

[56] References Cited

U.S. PATENT DOCUMENTS

| | | | |
|---|---|---|---|
| 2,146,506 | 2/1939 | Maisch | 350/526 |
| 3,096,767 | 7/1963 | Gresser et al. | 350/527 |
| 3,161,717 | 12/1964 | Barabàs et al. | 350/526 |
| 3,175,458 | 3/1965 | Costa | 350/523 |
| 3,442,583 | 5/1969 | Rottmann | 350/527 |
| 4,284,327 | 8/1981 | Kraft et al. | 350/526 |
| 4,291,938 | 9/1981 | Wagner | 350/525 |
| 4,652,093 | 3/1987 | Stephen et al. | 350/500 |
| 4,737,022 | 4/1988 | Faltermeier et al. | 350/526 |

FOREIGN PATENT DOCUMENTS 1913711 10/1969 Fed. Rep. of Germany ...... 350/523

OTHER PUBLICATIONS

Bartz et al., "LED Print Analyzer", IBM Technical Disclosure Bulletin, vol. 14, No. 3, Aug. 1971, p. 887.

Primary Examiner—Bruce Y. Arnold
Assistant Examiner—Terry S. Callaghan
Attorney, Agent, or Firm—Cushman, Darby & Cushman

[57] ABSTRACT

In order to be suited for long-term use in an enclosed space and to enable various modes of illumination by simple procedures and at a low cost without adding special optical components, the illuminating device for microscopes of the invention comprises a surface light source including a plural number of semiconductor light sources arranged in two dimensions, a control circuit selectively lighting some or all of the plural number of semiconductor light sources in conjunction with selection of an illumination mode, and an optical system for condensing and transmitting the light from the surface light source. The illuminating device of the invention makes it possible to observe a sample simultaneously in different illumination modes when the illuminating device is equipped with three surface light sources and the sample is irradiated simultaneously with the lights from the three surface light sources.

10 Claims, 5 Drawing Sheets

ILLUMINATING DEVICE FOR MICROSCOPES

BACKGROUND OF THE INVENTION (a) Field of the invention:

The present invention relates to a microscope and more specifically to an illuminating device for microscopes.

(b) Description of the prior art:

The conventional illuminating devices for microscopes use tungsten lamps, halogen lamps, etc. as illuminating light sources. However, these illuminating devices have defects in that they have high carolific power, high power consumption, short service life, low resistance to vibration, large design and heavy weight. Therefore, the conventional illuminating devices for microscopes are quite inadequate for long-term use in enclosed spaces, for example, laboratories provided in artificial earth satillites.

Further, for microscopy in various illumination modes such as bright field illumination, dark field illumination, oblique illumination and ring-shaped illumination, the conventional illuminating devices require addition of special optical components, for example, ring slits and light-shielding plates, thereby complicating operating procedures and requiring high cost.

SUMMARY OF THE INVENTION

In view of the above-mentioned problems, a general object of the present invention is to provide an illuminating device for microscopes suited for long-term use in enclosed spaces, and to permit various illumination modes by simple procedures and at low cost without adding special optical components.

According to the present invention, this object can be accomplished by providing a spot light source consisting of a single semiconductor and/or surface light source consisting of plural number of semiconductor light sources arranged in two dimensions, a control circuit for selectively lighting the spot light source and/or some or all of the plural semiconductor light sources in said surface light source, and an optical system for condensing and transmitting lights emitted from the spot light source and/or surface light source.

In a preferred formation of the present invention, a ground glass plate is arranged on the front surface of the surface light source.

In another preferred formation of the present invention, the illuminating device is equipped with a plural number of spot light sources and/or surface light sources emitting lights of different wavelengths.

The illuminating device for microscopes according to the present invention is compact in design, light in weight, low in power consumption, low in carolific power, long in service life, excellent in resistance to vibration, suited for long-term use in enclosed spaces, and permits various modes of illumination in simple procedures and at low cost without adding special optical components. Further, the illuminating device for microscopes according to the present invention has an advantage to realize observation mode unavailable with the conventional microscopes by combining semiconductor light sources having different wavelengths.

Furthermore, the illuminating device for microscopes according to the present invention is usable in special environments, for example, in a vacuum such as aerospace.

These and other objects as well as the features and advantages of the present invention will be apparent from the following detailed description of the preferred embodiments when taken in conjunction with the accompanying drawings.

DESCRIPTION OF THE PREFERRED EMBODIMENTS

Now, the present invention will be described in details below with reference to the preferred embodiments illustrated in the accompanying drawings wherein the solid and dashed lines represent light, and the chain line designates the optical axis.

Figure 1:
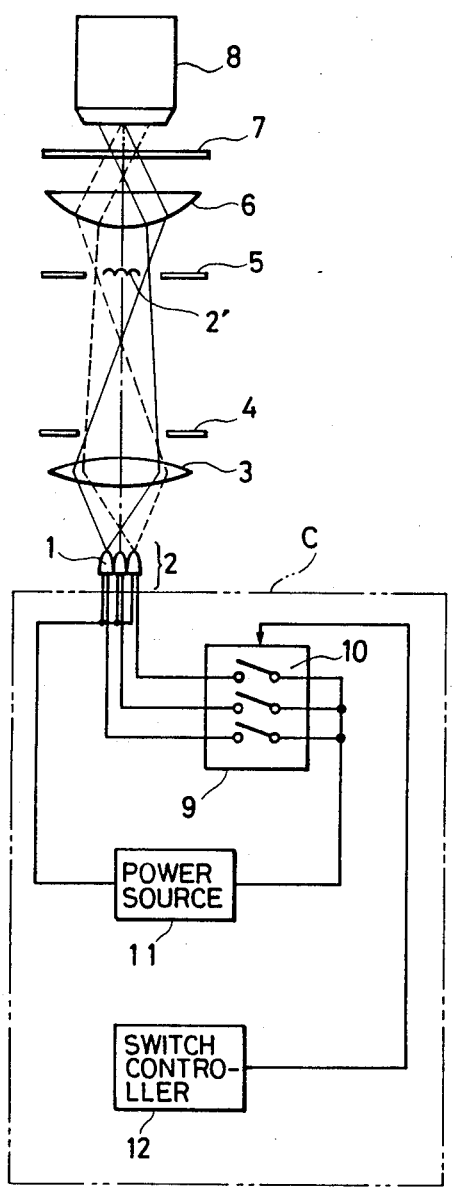
FIG. 1 is a schematic view illustrating an embodiment of the illuminating device for microscopes according to the present invention.

FIG. 1 shows the first embodiment of the illuminating optical system according to the present invention which is the same as the Köhler illuminating optical system known as a typical illuminating optical system for microscopes. The illuminating optical system uses a surface light source 2 consisting of semiconductor light source 1 (for example, LEDs or laser diodes) arranged in two dimensions in place of the ordinary halogen lamp. The light emitted from the surface light source 2 is condensed by a condensing lens 3 and, after passing through a field stop 4, focused as an image of the surface light source 2' at the position of an aperture stop 5 placed in the vicinity of the front focal plane of a condenser lens 6. The focused image of the surface light source functions as a second light source, and the light emitted from this light source passes through the condenser lens 6 and irradiates a sample 7 as nearly parallel rays. Further, the light having passed through the sample 7 is incident on an objective lens 8 of a microscope for enlarging the image of sample 7. Furthermore, each semiconductor light source 1 of the surface light source 2 is connected to each stitch 10 in a switch unit 9, and to a power source 11 for lighting each semiconductor light source 1 through the switch unit 9. Moreover, the individual switches 10 in the switch unit 9 are turned on by a switch controller 12 selectively in various illumination modes to light corresponding semiconductor light sources 1. In addition, the switch unit 9, power source 11 and switch controller 12 together comprise a control circuit C. Further, the control circuit C can be also provided with a light adjusting means for adjusting the brightness of the light source 1.

Figure 2:
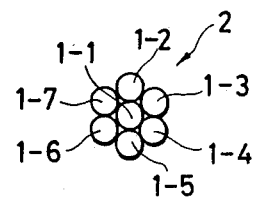
FIGS. 2, 3A and 3B are plan views illustrating an example of a surface light source and another example of a surface light source, respectively.

FIG. 2 shows an example of the surface light source 2 wherein seven semiconductor light sources 1 are arranged in two dimensions. In addition, descriptions will be made on an assumption that the semiconductor light source 1-1 is arranged on the optical axis.

Light emitting patterns of the surface light source 2 in various illumination modes will be described below:

(1) Bright field illumination

All the seven semiconductor light sources 1-1, 1-2, 1-3, 1-4, 1-5, 1-6 and 1-7 are lighted.

(2) Dark field illumination or ring-shaped illumination

Six semiconductor light sources 1-2, 1-3, 1-4, 1-5, 1-6 and 1-7 other than the semiconductor light source 1-1 are lighted.

(3) Oblique illumination

One or some of the semiconductor light sources apart from the optical axis other than the semiconductor light source 1-1, for example, 1-2 or 1-2 and 1-3 are lighted.

Various modes of illumination are available without the conventional special optical components by selectively lighting, as described above, a plural number of semiconductor light sources 1 with the switch controller 12 and switch unit 9 in the control circuit C. Further, when the semiconductor light sources 1 are used as the light source as described above, the illuminating optical system has advantages of low carolific power, low power consumption, long service life, excellent resistance to vibration, compact design and light weight, thereby being suited for long-term use in enclosed spaces.

Figure 3A:
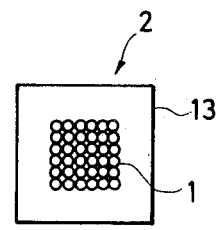

FIG. 3A shows another example of the surface light source 2 designed as an on-chip surface light source consisting of a plural number of semiconductor light sources 1 (having a diameter of several tens of micrometers to several hundreds of micrometers) arranged in two dimensions on a semiconductor chip 13 of several millimeters square.

Figure 3B:
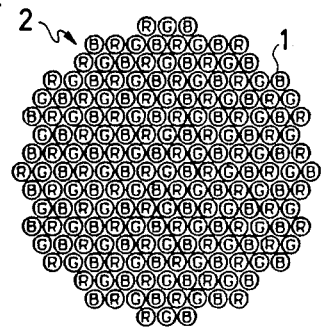

FIG. 3B shows still another example of the surface light source 2 wherein a plural number of semiconductor light sources capable of emitting red light, green light, blue light and the like are arranged in two dimensions. According to this example, the surface light source having various kinds of color light can be obtained by the operation of the control circuit C, instead of changing over various filters in the conventional illuminating device.

Figure 4:
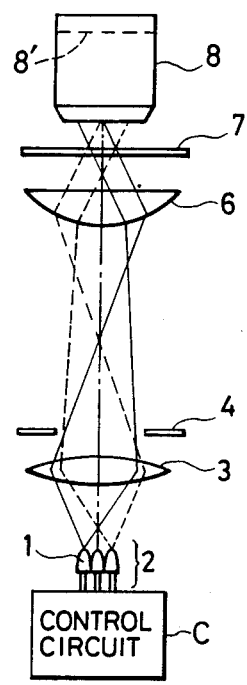
FIG. 4 is a sectional view illustrating a second embodiment of the illuminating optical system according to the present invention.
Figure 5:
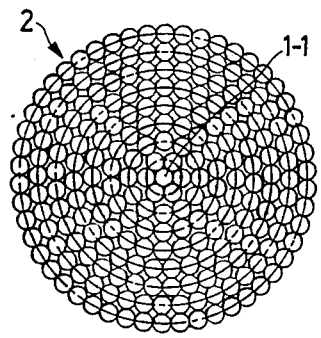
FIG. 5 is a plan view illustrating an example of a surface light source used in the second embodiment.

FIG. 4 shows the second embodiment 2 of the present invention wherein an illuminating optical system is composed by removing the aperture stop 5 from the optical system shown in FIG. 1 and using an objective lens 8 including therein various modulating means 8' located at a position conjugate with the surface light source 2. In this system, the surface light source 2 is, as shown in FIG. 5, formed by arranging coaxially the semiconductor light sources around the semiconductor light source 1-1 arranged on the optical axis in the same manner as in FIG. 2. Light emitting patterns of this surface light source capable of being controlled by the control circuit C will be described below:

(1) Bright field illumination

The size of the surface light source 2 is changed by putting out in turn the semiconductor light sources arranged coaxially, from the outer side, to enable adjustment to suit to the size of an aperture which is varied by changing the magnification of the objective lens 8.

(2) Phase contrast illumination

Figure 5E:
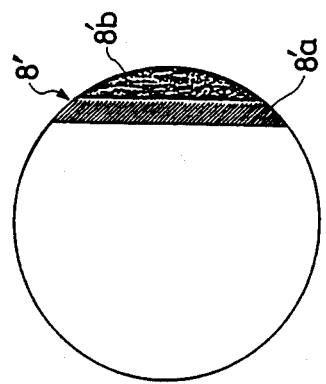
FIGS. 5A through 5F are plan views illustrating three modulating means different from each another used in the second embodiment and lighting modes of the surface light source respectively corresponding to the three modulating means.
Figure 5F:
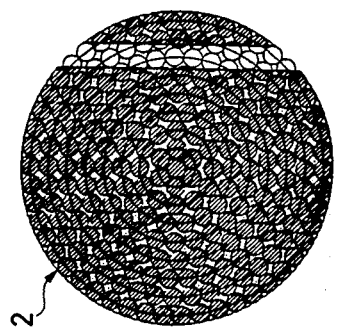
Figure 5C:
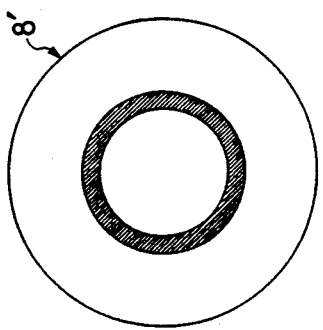
Figure 5D:
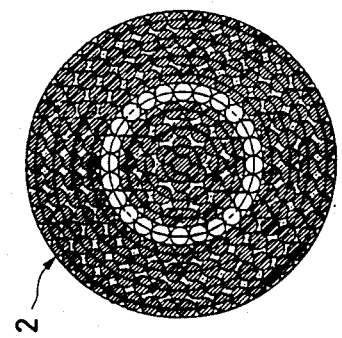
Figure 5A:
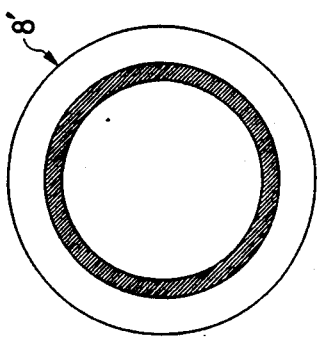
Figure 5B:
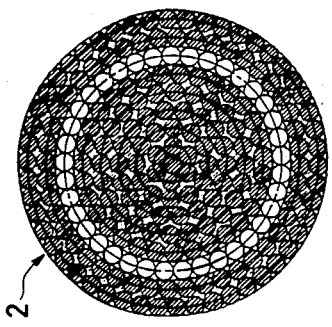

The objective lens 8 includes a phase plate as the modulating means 8'. FIGS. 5A and 5C show the phase plates 8' to be used in the objective lenses 8 for different magnifications, and FIGS. 5B and 5D show the surface light sources 2 which are lighted so as to correspond to the phase plates 8' shown in FIGS. 5A and 5B.

(3) Hoffman modulation contrast illumination (U.S. Pat. No. 4,200,353)

The objective lens 8 includes a modulating film as the modulating means 8'. FIG. 5E shows the modulating film 8' having a semitransparent portion 8'a and a light interrupting portion 8'b, and FIG. 5F shows, the surface light source 2 which is lighted so as to correspond to this modulating film 8'. Further, all or a part of the semiconductor light sources which is not lighted in the surface light source 2 may be lighted obtain a change of contrast.

Figure 6:
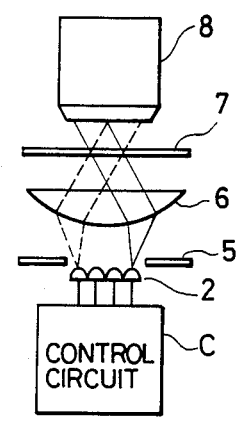
FIG. 6 is a sectional view illustrating a third embodiment of the illuminating optical system according to the present invention.

FIG. 6 illustrates the third embodiment of the present invention wherein a compact illuminating optical system is composed by arranging a small surface light source 2 at the position of the aperture stop 5 while omitting the condensing lens 3 and the field stop 4.

Figure 7:
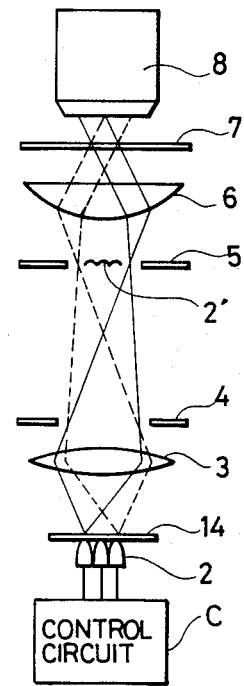
FIGS. 7 and 8 are sectional views illustrating fourth and fifth embodiments of the illuminating optical system according to the present invention.
Figure 8:
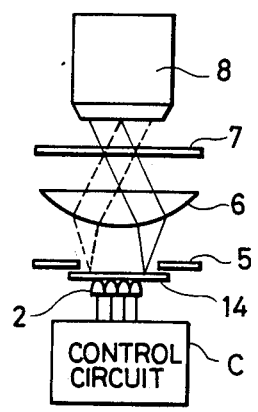

FIGS. 7 and 8 show the Embodiments 4 and 5 respectively of the present invention wherein a ground glass plate 14 for cancelling the illuminating nonuniformity of the surface light source 2 is arranged on the front surface (on the side of the objective lens) of the surface light source 2.

Figure 9:
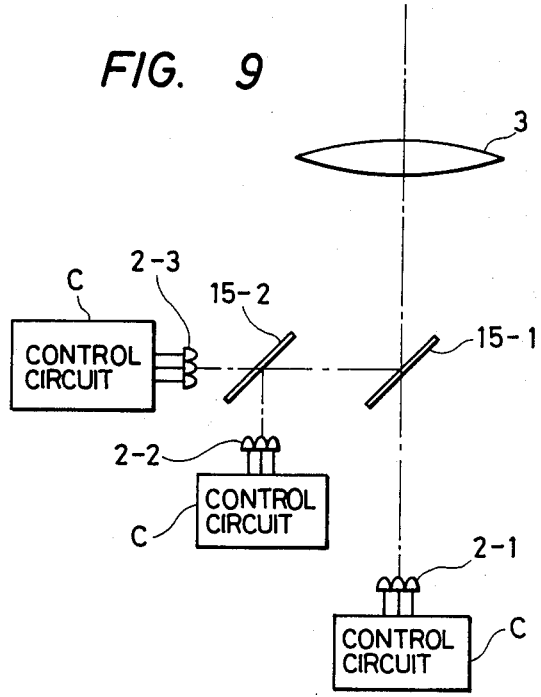
Fig 9 is a sectional view illustrating a sixth embodiment of the illuminating optical system according to the present invention.

FIG. 9 illustrates the sixth embodiment of the present invention wherein surface light sources 2-1, 2-2 and 2-3 having different light wavelengths (for example, red, green and blue) are arranged at positions optically conjugate with one another. By selecting different light emitting patterns for the individual surface light sources, i.e., by using the surface light sources 2-1 and 2-2 as bright field illuminating light sources, and the surface light source 2-3 as a dark field illuminating light source, for example, it is possible to observe a sample simultaneously in different illumination modes. In addition, the dichroic mirror 15-1 shown in FIG. 9 has a function to transmit the light from the surface light source 2-1, and to reflect the lights from the surface light sources 2-2 and 2-3, whereas the dichroic mirror 15-2 has a function to transmit the light from the surface light source 2-3 and reflect the light from the surface light source 2-2.

Figure 10:
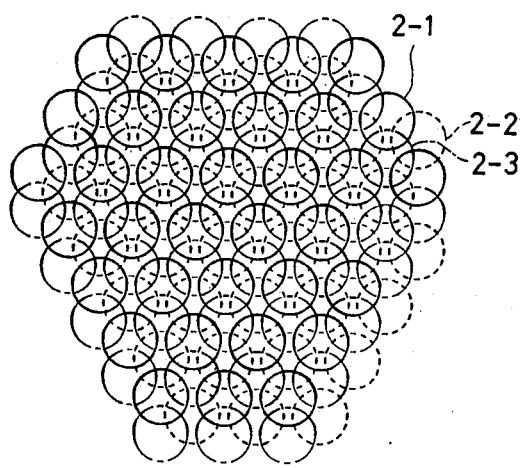
FIG. 10 is a plan view illustrating another arrangement of the respective surface light sources in the sixth embodiment.

FIG. 10 shows a relative arrangement relation of the surface light sources 2-1, 2-2 and 2-3 in which the semiconductor light sources are arranged in the highest density. According to this arrangement, gaps between the semiconductor light sources in each surface light source are occupied by the semiconductor light sources in the other surface light source. Therefore, a relatively bright uniform illumination can be obtained without using the ground glass plate.

Figure 11:
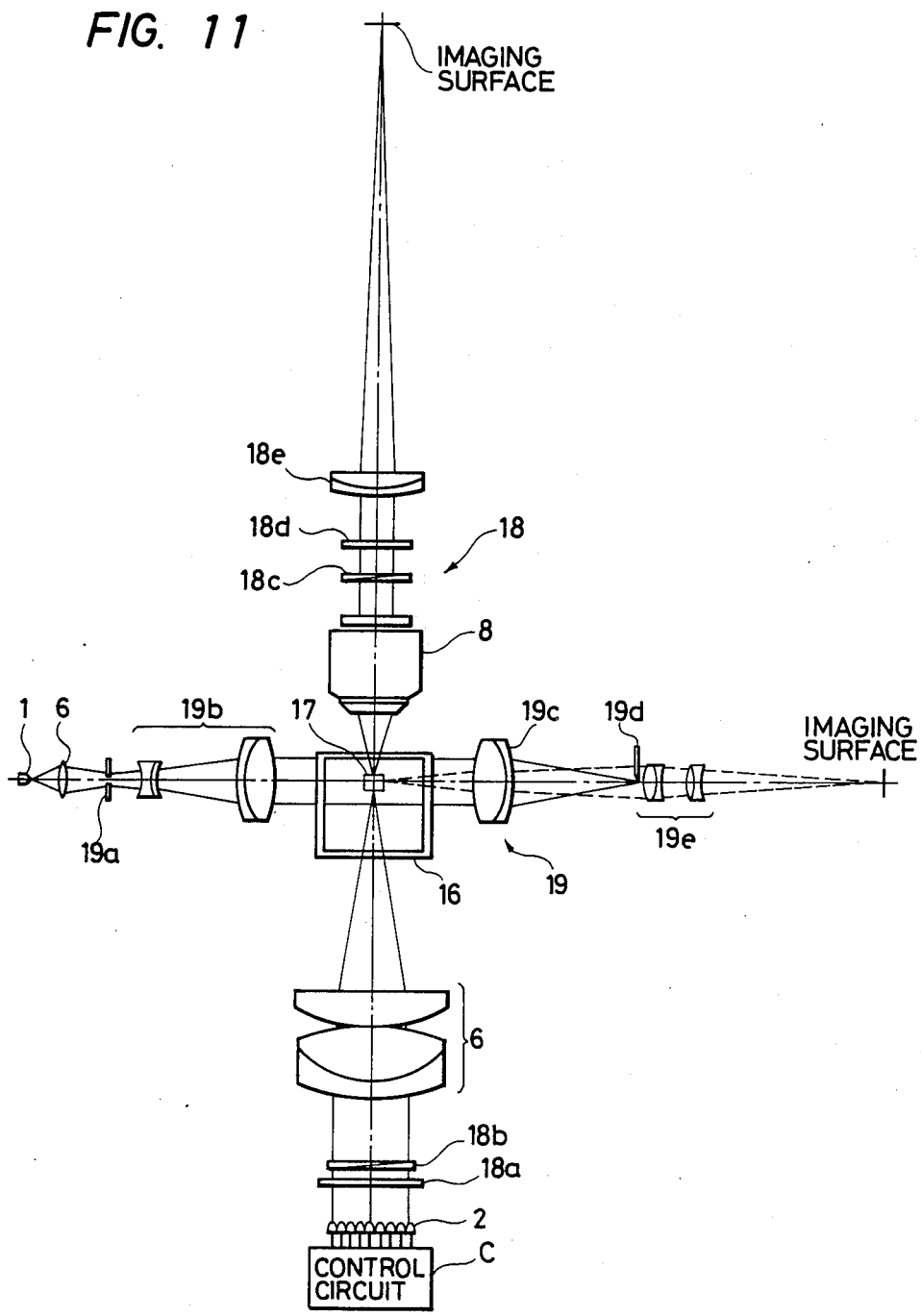
FIG. 11 is a sectional view illustrating a seventh embodiment of the optical system according to the present invention.

FIG. 11 shows the seventh embodiment of the present invention used in an optical system for observing growth of a crystal (for example, KAP) 17 in a solution contained in an enclosed container. The optical system consists of an optical system of a differential interference (Nomarski) microscope 18 for observing the crystal surface (the optical system vertically arranged in the drawing) and a schlieren optical system 19 for observing concentration distribution of the solution around the crystal (optical variation of refractive index). The optical system of the differential interference microscope 18 consists of an illuminating optical system comprising a surface light source 2 including a plural number of red LEDs, a polarizer 18a, a differential interference prism 18b and a condenser lens 6, and an imaging optical system comprising an objective lens 8, a differential interference prism 18c, an analyzer 18d and an imaging lens 18e. Further, the schlieren optical system 19 consists of an illuminating optical system comprising a single red LED 1, a condenser lens 6, a pinhole 19a and a collimator 19b including a schlieren lens, and an imaging optical system comprising a schlieren lens 19c, a knife edge 19d and an imaging lens 19e. These optical systems 18 and 19 use LEDs having super-high brightness (H-3000 manufactured by Stanley Electric Co., Ltd. (red wavelength 660 nm, brightness 3000 mcd) or infrared diodes having super-high output DN305 (wavelength 850 nm, radiation output 80 mW/sr)). A prototype of the sixth embodiment of the present invention fully exhibits optical performance and the merit of the LEDs. In addition, the microscope optical system 18 selected a focal length of 135 mm for the imaging lens 18e, and a magnification level of 10x, an NA of 0.25 and a working distance of 12 mm for the objective lens 8. In the schlieren optical system, the pinhole 19a has a diameter of 0.8 mm.

What is claimed is:

1. An illuminating device for microscopes comprising a surface light source including a plural number of semiconductor light sources arranged in two dimensions, a control circuit connected to said surface light source for lighting some or all of said plural number of semiconductor light sources in conjunction with selection of an illumination mode, and an optical system arranged in alignment with said surface light source for condensing and transmitting light emitted from said surface light source, one of said plural number of semiconductor light sources being arranged on the optical axis of said optical system and the rest of said semiconductor light sources being arranged along a circle coaxial with the optical axis.

2. An illuminating device according to claim 1 wherein said surface light source is controlled by said control circuit to be lighted with a ring-like pattern coaxial with the optical axis of said optical system.

3. An illuminating device according to claim 1 wherein said surface light source is controlled by said control circuit to be lighted with a straight line pattern parallel with the diameter of said circle.

4. An illuminating device according to claim 1 wherein said plural number of semiconductor light sources are arranged so as to form a square.

5. An illuminating device according to claim 1 further comprising a ground surface, glass plate arranged in front of said surface light source for uniform illumination.

6. An illuminating device according to claim 1 wherein said surface light source includes a plural number of semiconductor light sources which emit red light, a plural number of semiconductor light sources which emit green light and a plural number of semiconductor sources which emit blue light.

7. An illuminating device according to claim 1 further comprising a second optical system consisting of a single semiconductor light source, a condenser lens, a pinhole and a collimator arranged consecutively, and having an optical axis intersecting perpendicularly with the optical axis of said optical system.

8. An illuminating device comprising a first surface light source including a plural number of semiconductor light sources arranged in two dimensions, a second surface light source emitting light having a wavelength different from that of said first surface light sources and including a plural number of semiconductor light sources, a third surface light source emitting light having a wavelength different from those of said first and second surface light sources and including a plural number of semiconductor light sources, a first control circuit connected to said first surface light source for selectively lighting some or all of said plural number of semiconductor light sources composing said first surface light source, in conjunction with the selection of an illumination mode, a second control circuit connected to said second surface light source for selectively lighting some or all of said plural number of semiconductor light sources composing said second surface light source, in conjunction with the selection of the illumination mode, a third control circuit connected to said third surface light source for selectively lighting some or all of said plural number of semiconductor light sources composing said third surface light source, in conjunction with the selection of the illumination mode, optical means arranged opposite to said first, second and third surface light sources, respectively, for leading the lights from said first, second and third surface light sources into the same optical path, and an optical system arranged on the optical axis of said optical means for condensing and transmitting the light from said first, second and/or third surface light sources that are lighted.

9. An illuminating device according to claim 8 wherein said first surface light source emits red light, said second surface light source emits green light and said third surface light source emits blue light respectively.

10. An illuminating device according to claim 8 wherein said first, second and third surface light sources are arranged so that when the lights from said first, second and third surface light sources are led into the same optical path by said optical means, a plural number of gaps to be formed between light bundles emitted respectively from said plural number of semiconductor light sources constituting one of said first, second and third surface light sources is occupied by light bundles emitted respectively from said plural number of semiconductor light sources constituting the other of said first, second and third surface light sources.

* * * * *